S. HANSSON.
ADJUSTABLE SIDE BEARING.
APPLICATION FILED JAN. 3, 1916.
1,233,348.
Patented July 17, 1917.
2 SHEETS—SHEET 1.
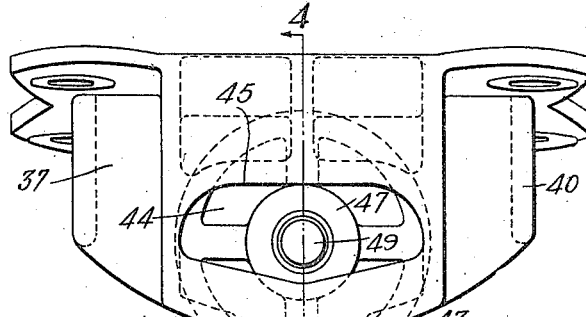
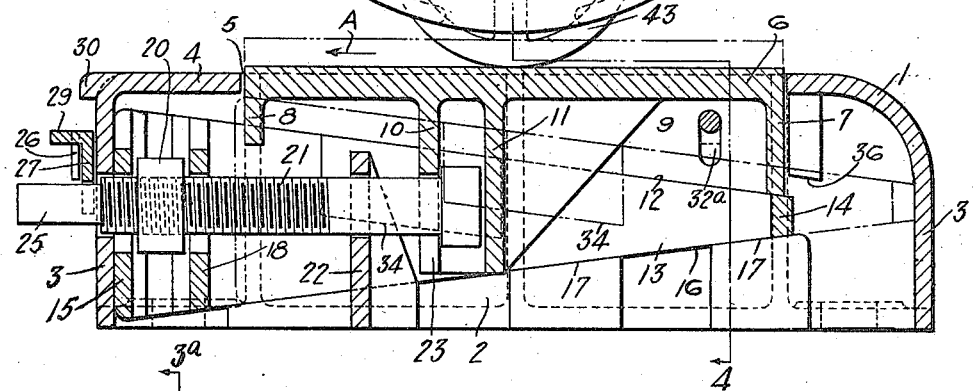
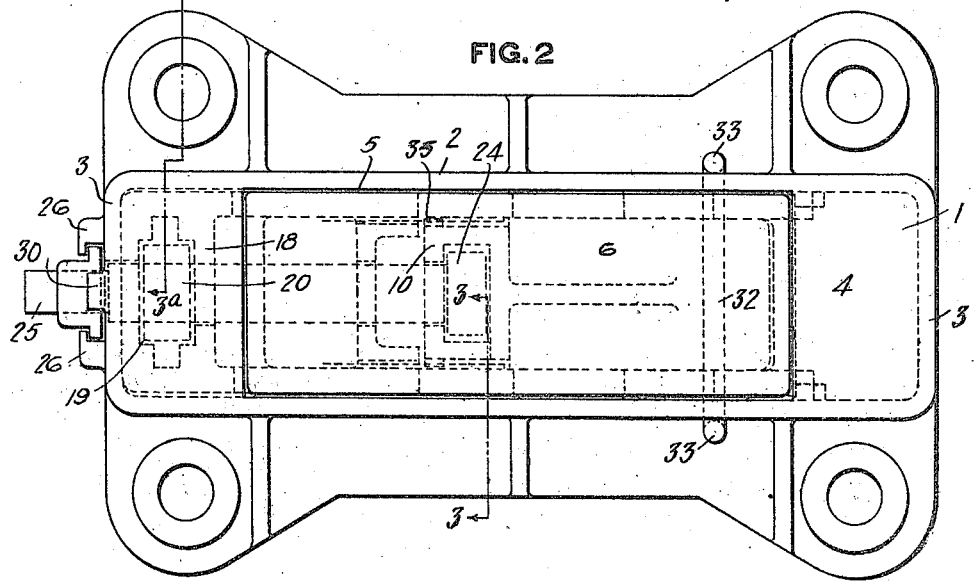
WITNESSES
INVENTOR

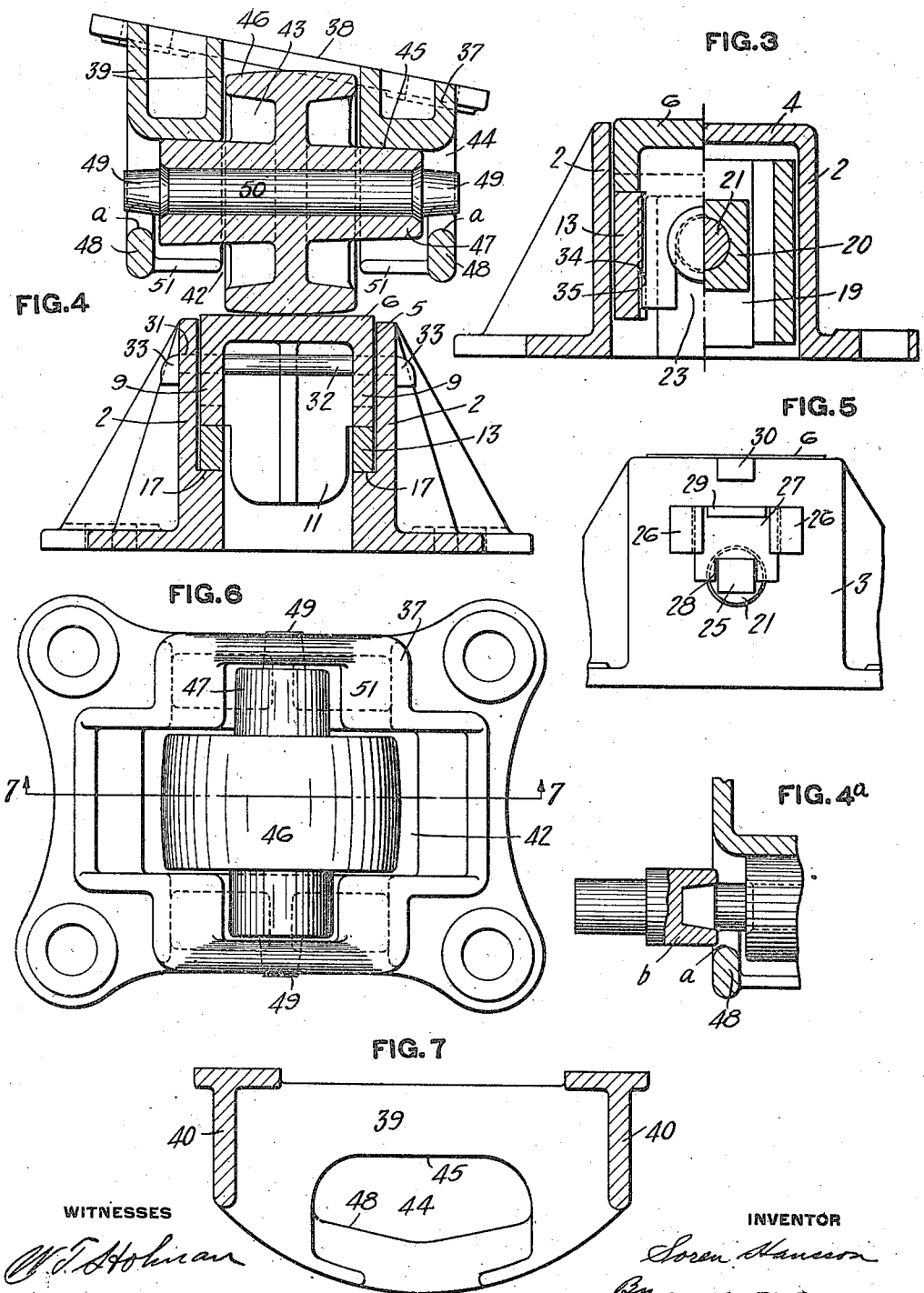

UNITED STATES PATENT OFFICE.

SOREN HANSSON, OF NEW GLASGOW, NOVA SCOTIA, CANADA.

ADJUSTABLE SIDE BEARING.

1,233,348.          Specification of Letters Patent.      Patented July 17, 1917.

Application filed January 3, 1916. Serial No. 70,069.

*To all whom it may concern:*

Be it known that I, SOREN HANSSON, a resident of New Glasgow, in the Province of Nova Scotia and Dominion of Canada, have invented a new and useful Improvement in Adjustable Side Bearings, of which the following is a specification.

This invention relates to adjustable antifriction side bearings for railway cars. The object of the invention is to provide a simple side bearing which is not liable to get out of order; which can be shipped or transported from place to place without fear of loss of some of the parts; whose bearing surface is adjustable relatively to the antifriction member to secure any desired clearance between bolsters or to compensate for wear or for application to any particular style or type of truck or body bolster; whose adjusting mechanism is of simple construction and easy to manipulate; whose antifriction member always travels with no other than rolling friction, returns automatically to central position in the housing and travels to a lesser degree on the upper than on the lower bearing surface; and finally, a side bearing all of whose parts are substantially locked in place so that they can not accidentally escape in service.

Further objects of the invention are in part obvious and in part will appear more in detail hereinafter.

The invention comprises the side bearing hereinafter described and claimed.

In the drawings, which represent one embodiment of the invention, Figure 1 represents a side elevation of the body bearing and a central longitudinal sectional elevation of the truck bearing, the full lines representing the position of the parts when the bearing surface is in its lowest position, and the dotted lines the same parts when the bearing surface is in its highest position; Fig. 2 is a plan view of the truck bearing; Fig. 3 is a cross section, the left hand half being taken on the line 3—3, and the right hand half on the line 3ª—3ª, Fig. 2; Fig. 4 is a cross section on the line 4—4, Fig. 1; Fig. 4ª is a detailed sectional view illustrating a riveting operation; Fig. 5 is a detail end view showing the locking member; Fig. 6 is a bottom plan view of the body bearing; and Fig. 7 is a longitudinal section on the line 7—7, Fig. 6, the roller being omitted.

The side bearing shown in the drawings comprises a truck bearing which may be formed as a part of or attached to the truck bolster, and a coöperating body bearing, which may be formed as a part of or attached to the body bolster. Each of these bearing members comprises a housing carrying or supporting the operating mechanism, and one of said bearings supports a bearing surface for coöperation with an antifriction member, such as a roller carried by the other bearing. In the particular form shown the bearing surface is on the truck bearing, while the antifriction member, to-wit, the roller, is carried by the body bearing, although the parts may be reversed and the roller supported by the truck and traveling on a bearing surface carried by the body bolster, as will be readily understood.

Referring now to the drawings, the truck bearing comprises a housing 1 provided with side walls 2, end walls 3 and a top 4, forming in effect a box or container for inclosing and protecting the operating parts of the truck bearing and also preventing entrance of dirt or foreign substances thereto. The top 4 is provided with a suitable opening 5, shown as rectangular, through which the bearing member 6 extends, so that the upper bearing surface of said member is exposed above the top 4 of the housing to receive the antifriction member or roller carried by the body bolster. The bearing member 6 substantially fills the opening 5, merely a slight clearance being provided around the edges of said opening so that they form guides for the vertically adjustable bearing member.

Bearing member 6 is in the form of a plate having depending end walls 7 and 8, side walls 9 and transversely extending cross walls or webs 10 and 11. The lower edges of the side walls 9 are formed on an incline, as indicated at 12, and rest upon the longitudinally extending side portions of an adjusting wedge 13, said side portions being connected by end portions 14 and 15 and also having their lower edges formed on an incline, as at 16, and seated upon inclined shoulders or guiding seats 17 in the lower portion of the housing and projecting from its side walls, as shown in Fig. 4. By adjusting the wedge longitudinally in the housing the bearing member 6 may be adjusted vertically therein, so as to extend its upper bearing surface more or less beyond the upper wall or roof of the housing and thereby increase or decrease the clearance between bolsters when the car is traveling on a straight track, or to compensate for wear of the bearing surface and consequent increase in clearance.

In order to adjust the wedge horizontally and the bearing member 6 vertically, one end of said wedge, for example, its larger end, is provided with a cross wall 18 forming with the end wall 15 a cavity or seat 19 for a non-circular nut 20, which is non-rotatable in said seat and is threaded upon an adjusting bolt 21. Said bolt extends through an opening in the end wall 3 of the housing and also through an opening in the stationary cross wall 22 of said housing, so that it is supported at both ends, and its inner end passes through a slot or opening 23 in the cross wall 10 of the bearing member 6 and is provided with a head 24 lying in the space between the walls 10 and 11 of said member. Said bolt is therefore longitudinally immovable relatively to the bearing member and housing, but the space between the walls 10 and 11 are large enough to permit said bolt head to rotate when adjusting the wedge longitudinally in the housing. The outer end of the bolt is preferably provided with suitable means for turning it, such as the non-circular wrench hold 25, which is shown as square. Above the bolt the housing 1 is provided with guides 26 for a vertically sliding locking member 27 whose lower edge is provided with a rectangular notch 28 to receive the wrench hold 25, and whose upper end is provided with a lifting member 29. The casing 1, above said locking member, is provided with an integral lug or projection 30, forming a stop for preventing the locking member 27 from escaping from the housing. Said locking member is inserted to place before the bolt is inserted in the housing and is therefore confined between said bolt and stop 30. It is lifted to release the bolt whenever adjustments are made of the bearing surface.

The two walls 10 and 11, between which the bolt head 24 is confined, prevent continued longitudinal strain or stress upon said bolt. For example, if longitudinal strain upon the bearing member 6 tends to move it in the direction of the arrow A, Fig. 1, said pressure is transmitted to the bolt and tends to jam the nut 20 against the end wall of the wedge, but sooner or later pressure is applied to the bearing member 6 in the opposite direction from the arrow A, and the second wall 10 thereupon pulls said bolt and nut, and also the wedge, to original position, so that pressure and strain upon the adjusting parts is not maintained for an appreciable time.

Suitable means is also preferably provided for preventing the bearing member 6 from escaping in the housing, so that it can not become displaced under the shocks and jars of service and is also locked in place and can not escape when shipped or transported. For this purpose the side walls of the housing may be provided with alined openings 31 to receive a cross pin 32 which extends also through vertically elongated holes 32ª in the side walls of the bearing member 6, thereby enabling said member to be adjusted vertically as before described. This pin can be forged or wrought metal part whose ends are bent over as shown at 33, after it is inserted in the housing. The same result can be obtained by providing one or both of the side members 13 of the wedge with an inwardly projecting longitudinally extending shoulder 34 engaging an outwardly extending shoulder, key or projection 35 on the bearing member 6, and shown as formed in the outer edge of the depending cross wall 10. With this arrangement it is necessary to move the wedge to its extreme end position, as shown in dotted lines, Fig. 1, in order to insert the bearing member 6 in the housing, but after the bearing member is inserted and the wedge is adjusted back to normal position the bearing member is held in place by the interlocking engagement of the shoulders 34 and 35 and can not escape from the housing. It can be readily removed, however, by again adjusting the wedge to its extreme position, as shown in dotted lines, Fig. 1. Either the pin 32 or the interlocking shoulders 34 may be used without the other, or, if desired, both may be employed in the same bearing to insure safety. Also, the housing 1 may be provided on one or both of its side walls with shoulders or abutments 36, arranged to prevent the wedge from rising from its seat more than a limited amount.

The truck bearing described to this point coöperates with a body bearing comprising a housing 37 which may be a part of or may be attached to the body bolster, and is shown as a metal casting having its upper face 38 cut off on an incline corresponding to the incline of the body bolster. Said housing is provided with light hollow side walls 39, end walls 40, and a bottom opening 42 through which the antifriction member, shown as a roller 43, extends into contact with the bearing surface of the truck bearing. The side walls 39 of said housing are provided with openings 44 whose upper edges or surfaces 45 are substantially straight and flat to produce a true horizontal movement of the roller during swiveling motion of the trucks. Said roller is provided with a large central wheel-like portion 46 rolling along the bearing surface of member 6, and with reduced spindle ends 47 which roll along the horizontal surfaces 45. Consequently the travel of the roller along the bearing surfaces 45 in the upper housing is much less than the travel of said roller along the bearing surface of the member 6, and the upper bearing is therefore of reduced size and lighter weight. Furthermore, when the bolsters separate the roller does not have to travel back so far to reach the center of the bearing as when it rolls an equal distance on both the upper and lower bearing surfaces.

To return the roller to central position in the housing the side walls of said housing are provided with longitudinally extending tracks 48, which are integral portions of the side walls of the housing and form the lower edges of the openings 44. Said tracks have curved upper surfaces, as shown at *a*, Fig. 4, to secure a clean rolling surface for the roller trunnions, and are also inclined downwardly on a fairly steep angle from both ends of the housing longitudinally toward its center. Said tracks coöperate with trunnions 49, which are the opposite end portions of a pin 50 inserted into an axial opening through the roller, and which also forms a lock for preventing said roller from escaping from the housing. In assembling the upper bearing member the roller is first inserted into place, the pin 50 is then pushed in from one end, and its opposite ends are then upset by a cupped head *b* from the form shown in Fig. 4ᵃ to the form shown in Fig. 4, so as to form the frusto-conical trunnions 49. Each track 48 is provided with inwardly extending flanges or ledges 51, which lie below the spindle ends 47 and form an additional support for the roller in case the trunnions 49 bend or break off. The end walls 40 of the housing also form positive stops to limit travel of the roller toward the ends of the housing and prevent it from escaping therefrom.

This form of side bearing is simple and can be manufactured and assembled at low cost. It has maximum strength with a minimum amount of metal and is so arranged that both parts of the bearing can be shipped or transported in assembled condition without fear of loss of any of the parts. The antifriction member always travels with full rolling friction on the coöperating bearing surface and even if the bolsters come together when the roller is at one end of the housing said roller will still travel with rolling friction on its large diameter and overcome any possible sliding friction on the small spindle ends. It therefore will not slide without rolling friction on a large diameter and thus wear flat. Furthermore, whenever the bolsters separate, the antifriction member automatically returns by gravity to central position in the housing. The lower bearing surface which coöperates with said roller is adjustable so that it can be applied to any form or type of bolster and with any desired amount of clearance between bolsters or to compensate for wear of the parts. The adjusting devices are relieved of all strain and may be readily locked in adjusted position. The lower bearing member is also effectually locked in the housing so that it can not escape therefrom, and its adjusting wedge is limited as to its vertical movement and will not lift from its seat.

What I claim is:—

1. A side bearing, comprising a housing for the lower bolster member, a bearing member movably mounted therein, inclined seats on said housing and bearing member, a wedge working on said seats for adjusting the bearing member vertically in the housing, and means for confining said bearing member in the housing and preventing it from escaping therefrom.

2. A side bearing, comprising a housing for the lower bolster member, a bearing member movably mounted therein, said housing and bearing member being provided with spaced oppositely inclined seats, a wedge coöperating with said seats and adjustable longitudinally in the housing for adjusting said bearing member vertically, and means for confining said bearing member in the housing and preventing it from escaping therefrom.

3. A side bearing, comprising a housing for the lower bolster member, a bearing member movably mounted therein, a longitudinally adjustable wedge for adjusting the bearing member vertically in the housing, and interlocking connections between said wedge and bearing member for confining the bearing member in the housing and preventing it from escaping therefrom and arranged when the wedge is adjusted to one limit of its travel to permit the bearing member to be removed from the housing.

4. A side bearing, comprising a housing for one of the bolsters, a roller in said housing having a central portion of large diameter arranged to travel on a coöperating bearing surface of the other bolster, spindle end portions of reduced diameter traveling on bearing surfaces in said housing, and separate means whereby said roller returns by gravity to central position in the housing and arranged to prevent its escape therefrom.

5. A side bearing, comprising a housing for one of the bolsters, a roller in said housing having a central portion of large diameter arranged to travel on a coöperating bearing surface of the other bolster, and spindle end portions of reduced diameter traveling on bearing surfaces in said housing, said roller having an axial opening and a pin in said opening provided with upset trunnion end portions, and tracks on said housing along which said trunnions travel.

6. A side bearing, comprising a housing for attachment to one of the bolsters, said housing being provided with hollow side walls and integral end walls connecting the same, a roller in said housing having a central portion of large diameter traveling between said side walls and spindle end portions of reduced diameter traveling on said bearing surfaces on said side walls, said side walls being provided with openings, and inclined tracks forming the lower edges of said openings, said roller being provided with trunnions projecting beyond said spindle end portions through said openings and traveling along said tracks.

7. A side bearing, comprising a housing for attachment to one of the bolsters, said housing being provided with hollow side walls and integral end walls connecting the same, a roller in said housing having a central portion of large diameter traveling between said side walls and spindle end portions of reduced diameter traveling on bearing surfaces on said side walls, said side walls being provided with openings, and tracks forming the lower edges of said openings, said roller being provided with trunnions projecting out through said openings and traveling along said tracks, said tracks being inclined downwardly longitudinally from both ends of the housing toward its center, whereby the roller returns by gravity to central position in the housing.

In testimony whereof, I have hereunto set my hand.

SOREN HANSSON.

Witnesses:
MARY C. ROSS,
SADIE M. PETTIS.

Copies of this patent may be obtained for five cents each, by addressing the "Commissioner of Patents, Washington, D. C."